(12) United States Patent
Kim

(10) Patent No.: US 7,721,706 B2
(45) Date of Patent: May 25, 2010

(54) MAGNESIUM THROTTLE BODY AND METHOD OF MANUFACTURING THE SAME

(75) Inventor: Jae Joong Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 18 days.

(21) Appl. No.: 11/977,993

(22) Filed: Oct. 25, 2007

(65) Prior Publication Data

US 2008/0313898 A1   Dec. 25, 2008

(30) Foreign Application Priority Data

Jun. 19, 2007   (KR) ..................... 10-2007-0059867

(51) Int. Cl.
*F01P 3/12*   (2006.01)
*F01P 11/04*   (2006.01)

(52) U.S. Cl. .................... 123/337; 123/41.31

(58) Field of Classification Search ............. 123/41.13, 123/41.22, 41.31, 337, 399; 251/305

See application file for complete search history.

(56) References Cited

U.S. PATENT DOCUMENTS

| 3,780,714 | A | * | 12/1973 | Dillow ........................ 123/546 |
| 4,036,188 | A | * | 7/1977 | Sami et al. ................ 123/41.31 |
| 4,934,341 | A | * | 6/1990 | Otsuka et al. ............ 123/41.31 |
| 6,408,817 | B2 | * | 6/2002 | Torii et al. .................... 123/337 |
| 6,516,776 | B1 | * | 2/2003 | Kai et al. ..................... 123/337 |
| 7,107,679 | B2 |   | 9/2006 | Arai et al. |
| 2001/0013332 | A1 | * | 8/2001 | Torii et al. .................... 123/337 |
| 2005/0022787 | A1 | * | 2/2005 | Arai et al. .................... 123/399 |
| 2007/0240677 | A1 | * | 10/2007 | Sasaki ........................ 123/337 |

FOREIGN PATENT DOCUMENTS

| JP | 1997-303164 | 11/1997 |
| JP | 1999-179817 | 7/1999 |
| JP | 2005-163555 | 6/2005 |

* cited by examiner

*Primary Examiner*—Erick Solis
(74) *Attorney, Agent, or Firm*—Edwards Angell Palmer & Dodge LLP; Peter F. Corless

(57) ABSTRACT

A magnesium-based throttle body is disclosed. The throttle body is manufactured by using a mold for manufacture of a throttle body. The throttle body includes a cooling water tube fixing portion into which a cooling water tube is press-inserted, the cooling water tube fixing portion being formed integrally with the throttle body.

2 Claims, 10 Drawing Sheets

PRIOR ART

PRIOR ART

PRIOR ART

PRIOR ART

PRIOR ART mounting surface mold

MAGNESIUM THROTTLE BODY AND METHOD OF MANUFACTURING THE SAME

CROSS-REFERENCE TO RELATED APPLICATION

This application claims the benefit under 35 U.S.C. §119(a) on Korean Patent Application No. 10-2007-0059867 filed on Jun. 19, 2007, the entire contents of which are incorporated herein by reference.

BACKGROUND

1. Technical Field

The present invention relates to a throttle body for a vehicle and a method of manufacturing the same, and more particularly, to a magnesium-based throttle body and a method of manufacturing the same, which provides corrosion-resistance structure to prevent corrosion reaction between the throttle body and cooling water passing therethrough.

2. Background Art

Automobile manufacturers have made intensive researches to produce automobiles with lighter weight and improved performance. In light of this, light power trains have been developed. To this end, parts made of aluminum-based material have been replaced by parts made of magnesium-based material which is lightweight relative to those made of aluminum-based material.

A throttle body or an Electronic Throttle Control (ETC) body, which is mounted on an intake manifold to control inhalation of air, is made by an aluminum die casting, since the aluminum die casting is advantageous in terms of dimensional accuracy of a final product, temperature resistance, and corrosion resistance.

A throttle body affects a Noise Vibration Harshness (NVH) characteristic of an intake manifold due to vibration thereof which may occur while an engine is running.

Since the NVH characteristic is relied on vibration caused by inertia, the less weight the throttle body has, the better NVH characteristic the intake manifold will have.

Therefore, various methods for reducing weight of the throttle body have been suggested. One method was to replace materials used for manufacturing a throttle body. One example of the method was to replace an aluminum-based material by a magnesium-based material. This method, however, has problems; for instance, corrosion reaction may occur between the magnesium-based throttle body and cooling water which passes through the throttle body.

More specifically, moisture in a throttle body may freeze in winter. In this instance, to prevent throttle valve control from being troubled, heated cooling water can be configured to circulate through the throttle body. Although the heated cooling water does not react with an aluminum alloy, it may react with a magnesium alloy, leading to corrosion in the throttle body.

There is thus a need for a magnesium-based throttle body that can overcome the problems.

The information disclosed in this Background section is only for enhancement of understanding of the background of the invention and should be taken as an acknowledgement or any form of suggestion that this information forms the prior art that is already known to a person skilled in the art.

SUMMARY OF THE INVENTION

The present invention has been made in an effort to solve the aforementioned problems associated with prior arts.

One object of the present invention is to provide a magnesium throttle body in which a corrosion-resistance structure is provided to prevent corrosion reaction between the magnesium throttle body and cooling water passing therethrough.

In one aspect, the present invention provides a magnesium throttle body which comprises a cooling water tube fixing portion into which a cooling water tube is press-inserted. The cooling water tube fixing portion is formed integrally with the throttle body.

In a preferred embodiment, a press-insertion opening is formed on a front portion of the cooling water tube fixing portion for press-insertion of the cooling water tube. Also, a fixing hole is formed in a left-right direction to penetrate the cooling water tube fixing portion so that the integral cooling water tube can be placed and fixed.

In another preferred embodiment, the throttle body can be manufactured by a mold. The mold for the throttle body has a pin of a diameter of about 10 mm which has no ejection taper. The pin is used to form the fixing hole in the cooling water tube fixing portion.

In another aspect, the present invention provides a method for manufacturing a throttle body, comprising: providing a die-casting mold for manufacture of a throttle body, which mold includes a pin having a diameter of 10 mm and having no ejection taper; forming a throttle body having a cooling water tube fixing portion integrally formed therewith by the die-casting mold; forming a fixing hole into which a cooling water tube is press-inserted in the cooling water tube fixing portion by using the pin of the die-casting mold; and press-inserting the cooling water tube into the fixing hole of the cooling water tube fixing portion, whereby the magnesium throttle body does not directly contact cooling water.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present throttle body and method of manufacturing the same will be particularly useful with a wide variety of motor vehicles.

Other aspects of the invention are discussed infra.

BRIEF DESCRIPTION OF THE DRAWINGS

The above and other features of the present invention will be described in reference to certain exemplary embodiments thereof with reference to the attached drawings in which.

DETAILED DESCRIPTION

Figure 1:
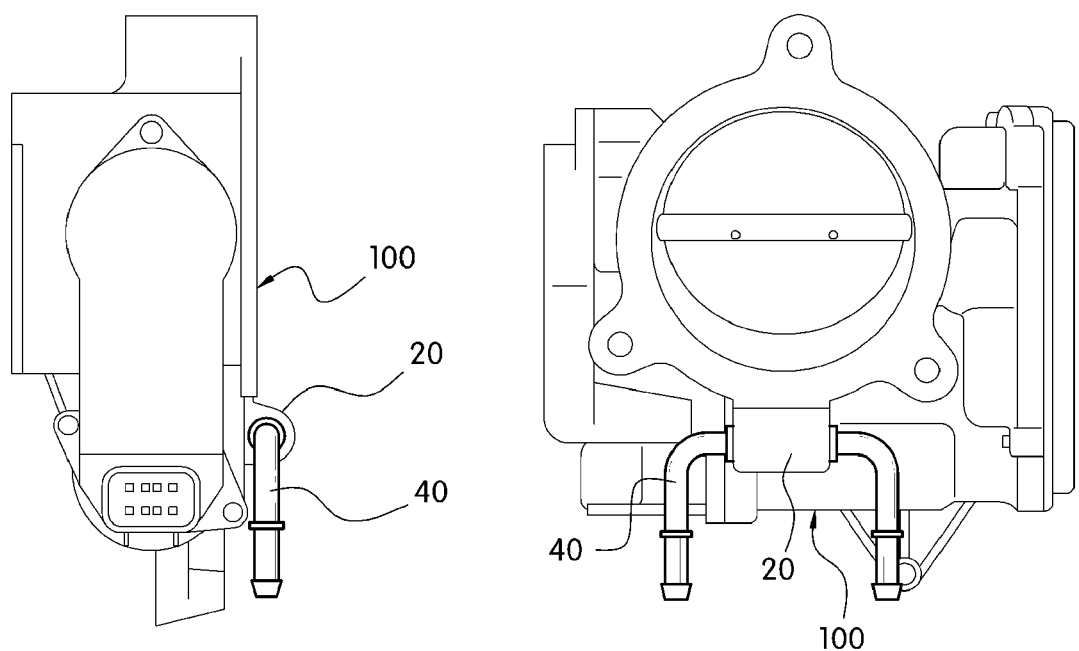
FIG. 1 shows a structure of a prior art aluminum throttle body.

Reference will now be made in detail to the embodiments of the present invention, examples of which are illustrated in the accompanying drawings, wherein like reference numerals refer to the like elements throughout. The embodiments are described below in order to explain the present invention by referring to the figures.

The present invention is directed to a magnesium throttle body with lighter weight and improved NVH performance and excellent durability, and a method for manufacturing the same. In the prior art, a throttle body is formed with an aluminum-based material; by contrast, in the present invention, it is formed with a magnesium-based material. Further, in the prior art, the throttle body is mounted by press-inserting two discrete cooling water tubes from opposite directions to each other with a predetermined process after die-casting; in contrast, according to the present invention, it is manufactured by press-inserting a single integral cooling water tube into the throttle body without any processing after die-casting.

The present invention provides a mold structure in order to realize the structure in which a single integral cooling water tube is press-inserted to a throttle body. The mold structure includes a pin that has no ejection taper, which makes it easy to press-insert a cooling water tube.

A throttle body to which the present invention pertains is a part mounted in an entrance of an intake manifold to constitute an ETC, an air flow control device. It is called an ETC body. The throttle body has a complicated structure and is currently made of an aluminum-based material.

The aluminum throttle body 100 comprises a throttle on-off device, gears for controlling the throttle on-off device, and a structure for protecting and supporting a motor. As indicated by a dotted line of FIG. 1, two discrete cooling water tubes 40 are mounted to the throttle body 100.

Throttle control may be impossible in winter. In such case, heated cooling water is supplied from the cooling water tube 40 to pass through the throttle body 100.

100. When the two discrete cooling water tubes 40 are mounted to a fixing hole 30b formed in a cooling water tube fixing portion 20, both tubes 40 are press-inserted from both directions, and so an empty space is formed between the two cooling water tubes 40.

Therefore, when cooling water supplied through the discrete cooling water tubes 40 passes through the empty space portion of the cooling water tube fixing portion 20, it would directly contact a surface of the aluminum throttle body 100. Since heated cooling water does not react with an aluminum alloy, no corrosion can occur. On the other hand, for a magnesium alloy, which reacts with cooling water, corrosion may occur.

Figure 3:
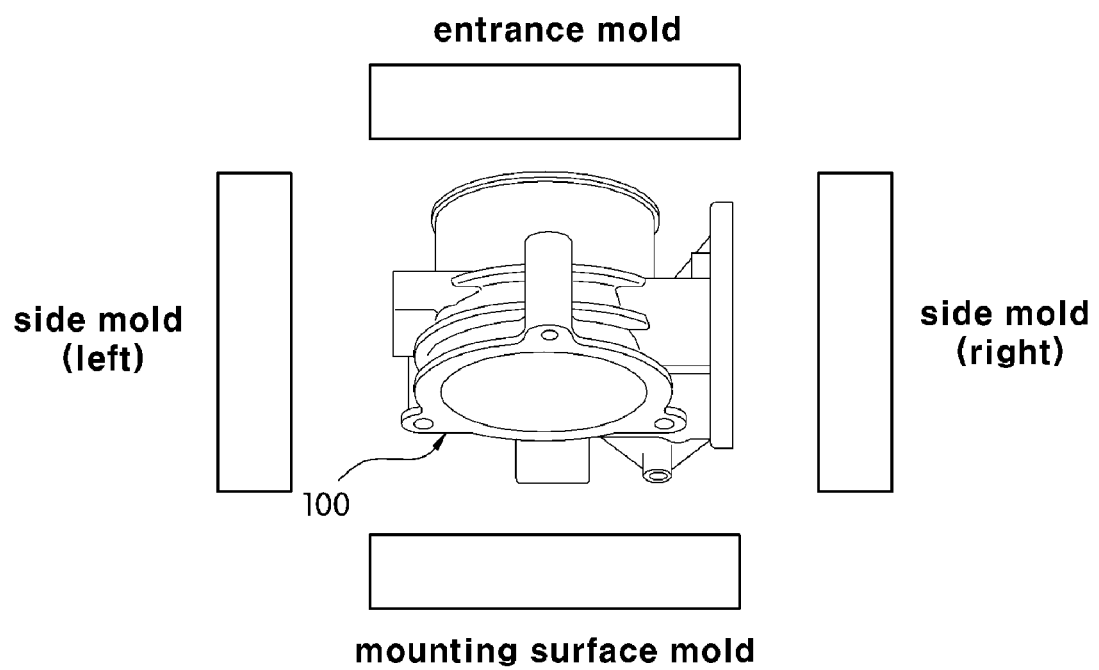
FIG. 3 schematically shows a mold arranged for a die casting of the prior art aluminum throttle body.

FIG. 3 schematically shows a mold arranged for die casting of the aluminum throttle body 100. Four molds are provided; an entrance mold, two side molds (left and right) and a mounting surface mold. Among the four molds, the side mold (see 301 in FIG. 4) and the mounting surface mold (see 302 in FIG. 4) are used to mold the cooling water tube fixing portion 20 integrally with the throttle body 100.

Figure 4:
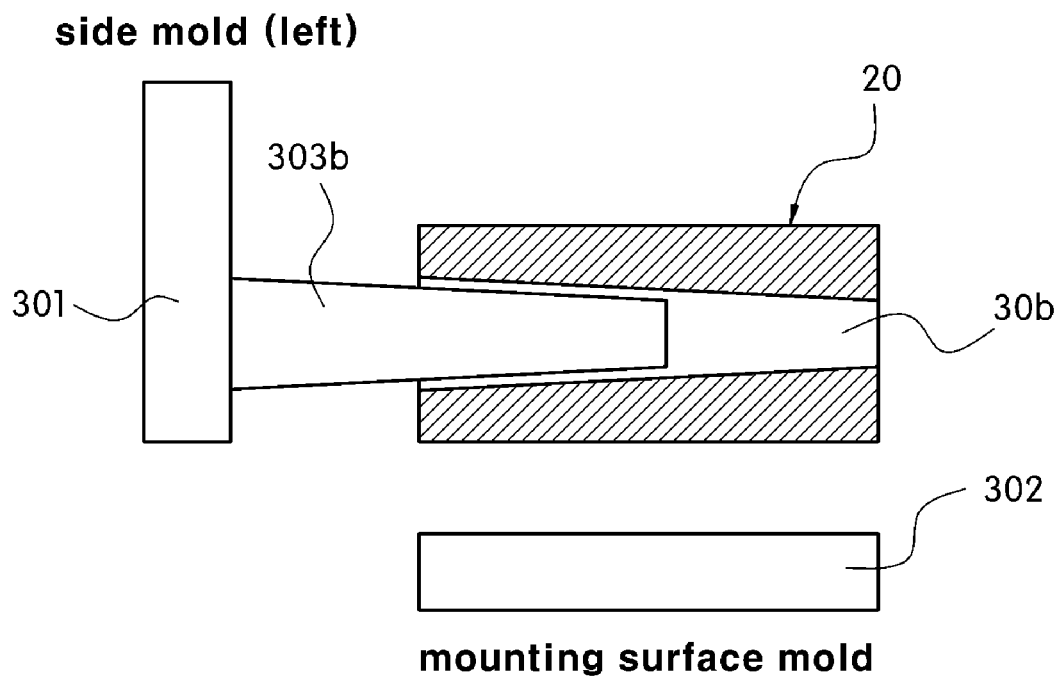
FIG. 4 shows a left side mold having a pin for forming a cooling water tube fixing hole in the prior art aluminum throttle body.

As shown in FIG. 4, the side mold 301 has a pin portion 303b which is used to form a fixing hole 30b for press-insertion of the cooling water tube 40. Here, an ejection taper with the depth of about 25 mm is usually applied to aluminum.

Figure 5:
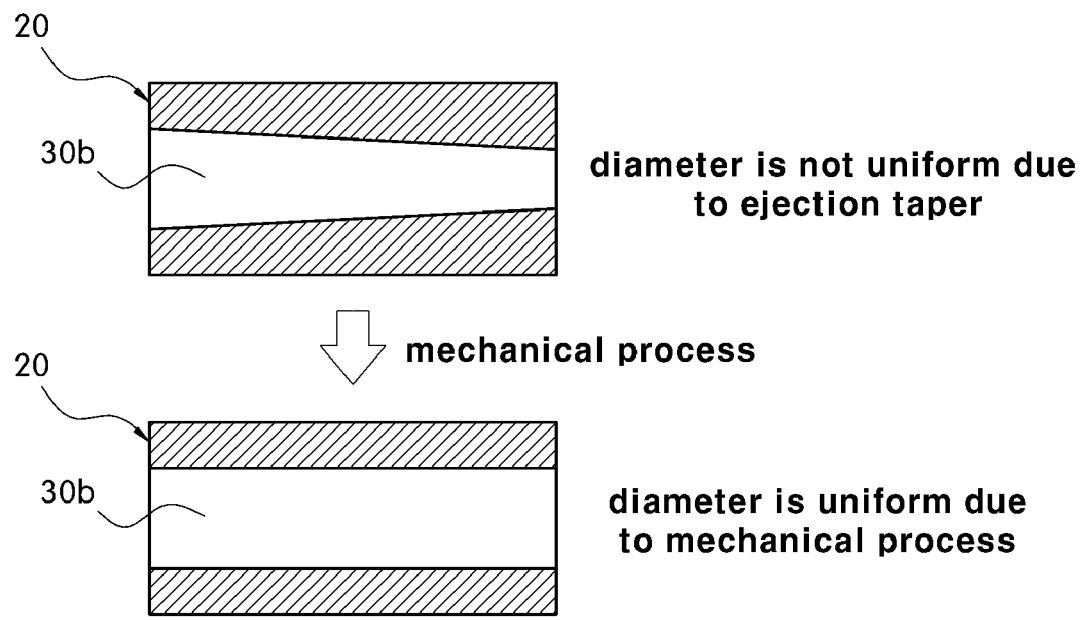
FIG. 5 shows a mechanical process for forming the cooling water tube fixing hole in the prior art aluminum throttle body.

Since a diameter of the fixing hole 30b is not uniform due to the ejection taper the fixing hole 30b portion is subjected to a further mechanical process in order to make uniform a diameter of the fixing hole 30b for press-insertion of the discrete cooling water tube 40 after die-casting, as shown in FIG. 5.

Figure 2:
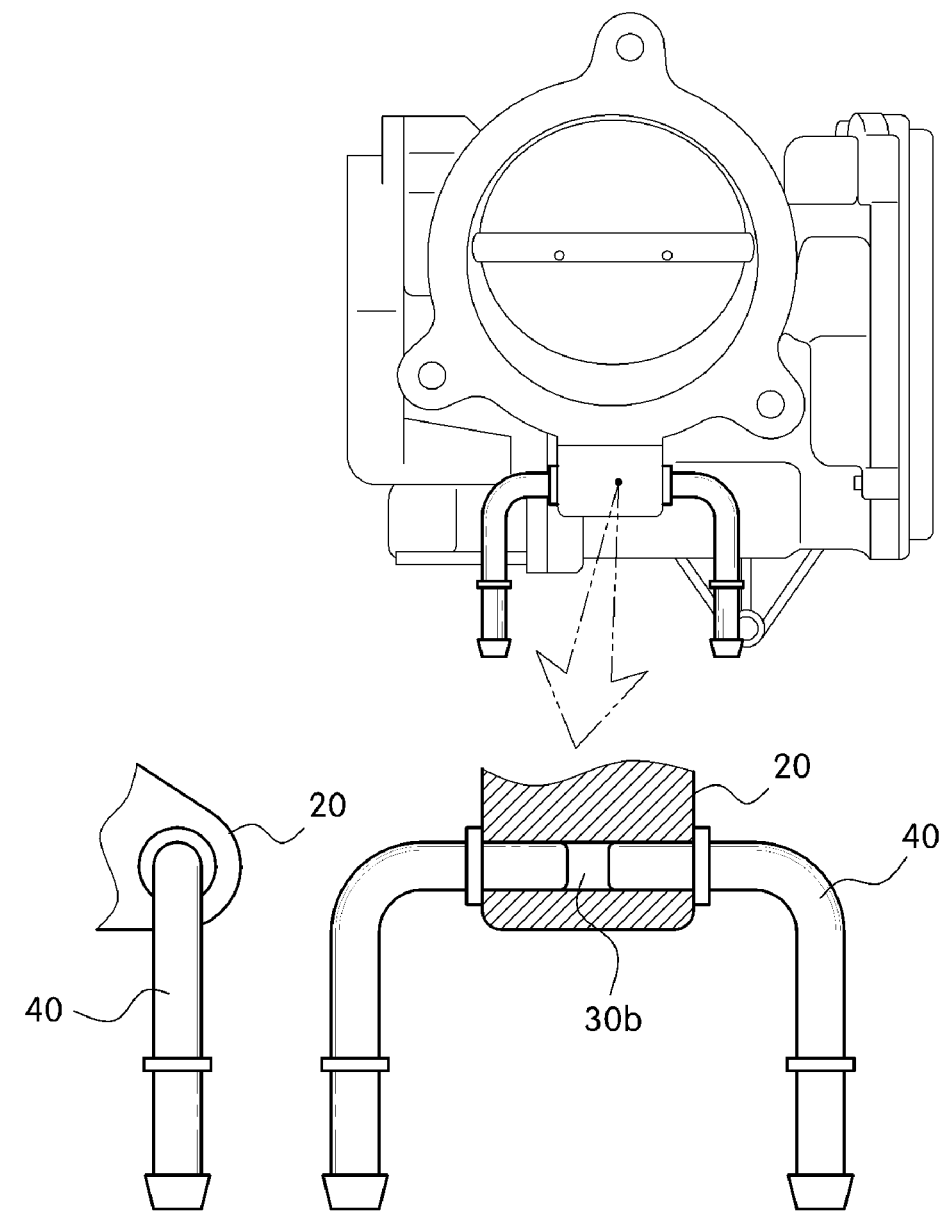
FIG. 2 shows a structure of the prior art aluminum throttle body of FIG. 1, in which discrete cooling water tubes are mounted to the aluminum throttle body.

Further, if the discrete cooling water tube 40 is mounted by the above described conventional method as shown in FIG. 2, the empty space exists between the cooling water tubes 40. In this instance, although an aluminum throttle body has no problem in durability, a magnesium throttle body can entail corrosion since it reacts with cooling water in the empty space portion.

The present invention takes into consideration of the above described problems to provide a structure in which the magnesium throttle body does not directly contact the cooling water thereby preventing the corrosion problem.

Throttle bodies of the present invention preferably are made of a magnesium alloy with the composition ratio shown in Table 1. The magnesium alloy having the composition ratio has minimum level of impurities and is excellent in castability for a die-casting and has advantages of being relatively excellent in corrosion resistance, physical property and price competitiveness.

TABLE 1

| | Chemical Components | | | | | | | |
| --- | --- | --- | --- | --- | --- | --- | --- | --- |
| | Al | Zn | Mn | Si | Cu | Ni | Fe | Mg |
| AZ91D | 8.3~9.7 | 0.4~1.0 | 0.15~0.5 | $\leq 0.1$ | $\leq 0.03$ | $\leq 0.002$ | $\leq 0.005$ | Remainder |
| AM60B | 5.5~6.5 | $\leq 0.2$ | 0.24~0.6 | $\leq 0.1$ | $\leq 0.01$ | $\leq 0.002$ | $\leq 0.005$ | remainder |

In order to help better understanding of the present invention, a prior art structure in which a cooling water tube is mounted to a aluminum throttle body is first explained below.

FIG. 2 shows a prior art structure in which discrete cooling water tubes 40 are mounted to the aluminum throttle body Even though a characteristic of a magnesium alloy used in the present invention is relatively excellent, when it is exposed to cooling water for a long time, a corrosion problem may occur as discussed above.

Figure 6:
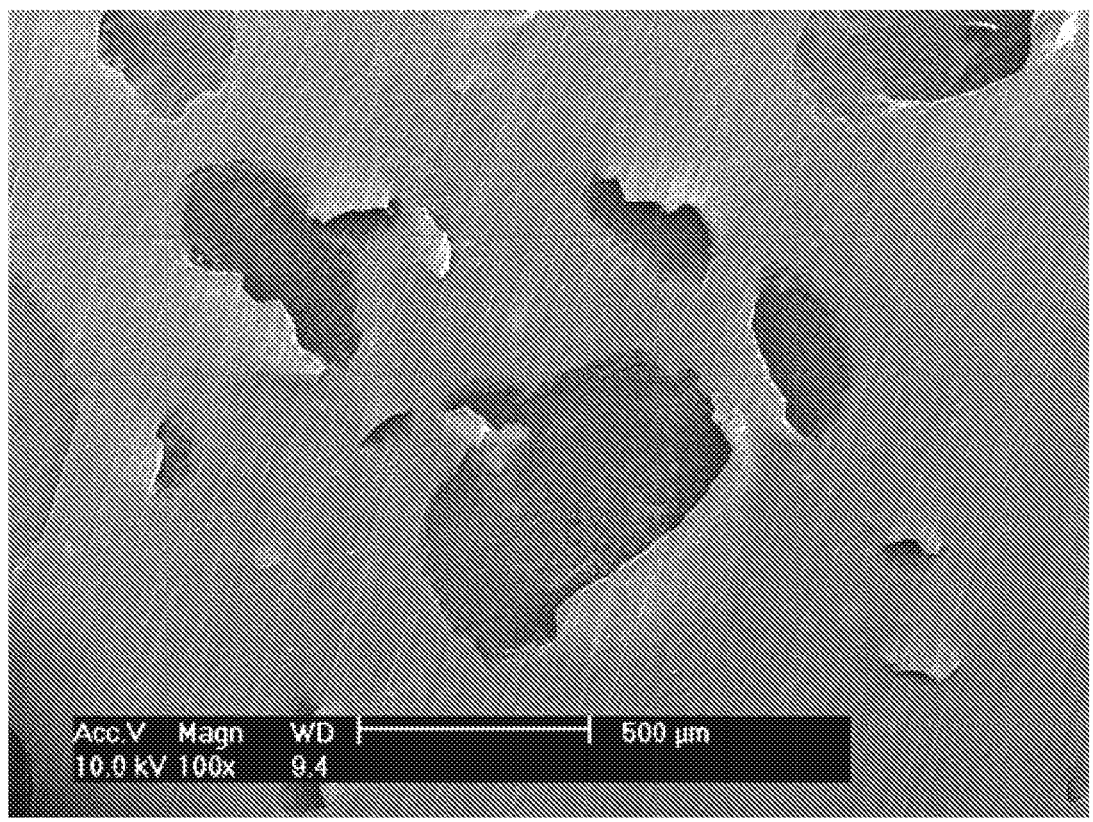
FIG. 6a is a magnified photograph showing a surface of a magnesium-based material when a magnesium-based material is exposed to cooling water heated at a temperature of 100° C. for a long time.
FIG. 6b is a graph illustrating a local component investigating result for the throttle body when a magnesium-based material is exposed to cooling water heated at a temperature of 100° C. for a long time.
Figure 6:
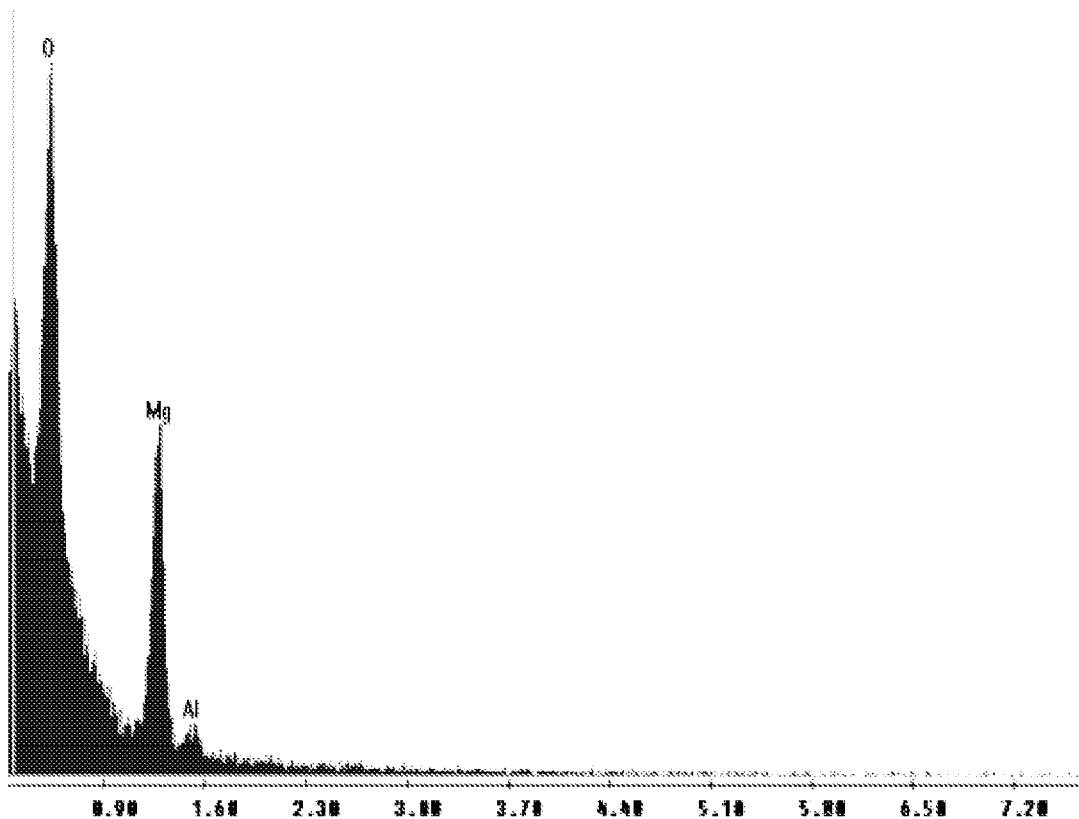

In order to confirm if the corrosion problem occurs when a magnesium-based material is exposed to heated cooling water for a long time, an experiment for exposing a magnesium-based material to cooling water heated at a temperature of 100° C. for a long time has been performed. A pitting phenomenon occurs as shown in FIG. 6a. Also, magnesium oxide is found when a local component investigation for the throttle body is performed as shown in FIG. 6b.

Here, FIG. 6a is a magnified photograph showing a surface of a magnesium-based material when the magnesium-based material is exposed to cooling water heated at a temperature of 100° C. for a long time, and FIG. 6b is a graph illustrating the result of a local component investigation for the throttle body when it is subjected to the same condition.

That is, an oxide layer locally falls apart due to flow of heated cooling water after surface oxidization occurs, and a phenomenon that oxidization occurs intensively in that position occurs repetitively, meaning that pitting occurs.

A structure of a magnesium throttle body and a method of manufacturing the same according to an exemplary embodiment of the present invention are described below with reference to FIGS. 7 to 9.

Figure 7:
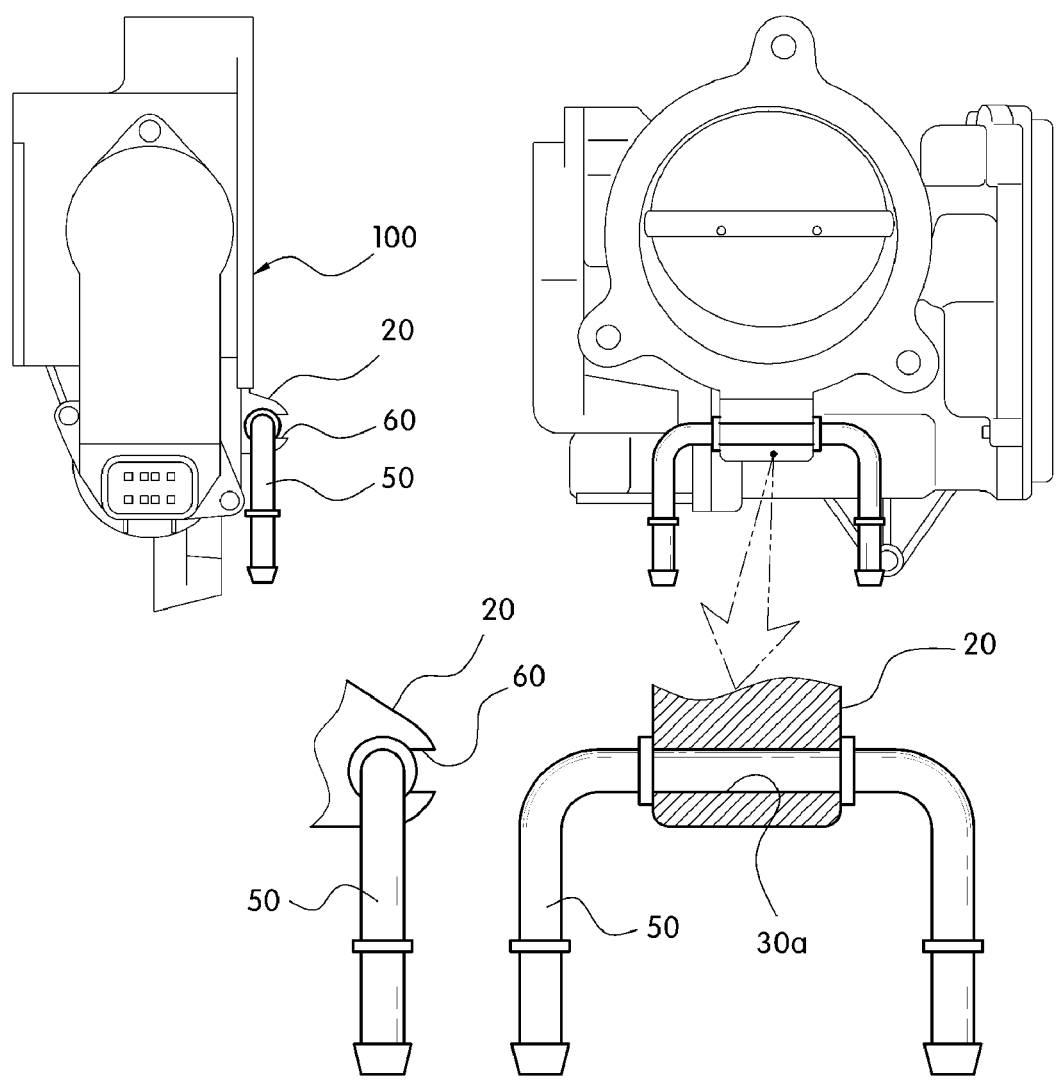
FIG. 7 is a schematic view illustrating the structure of a magnesium alloy throttle body according to an exemplary embodiment of the present invention.
Figure 8:
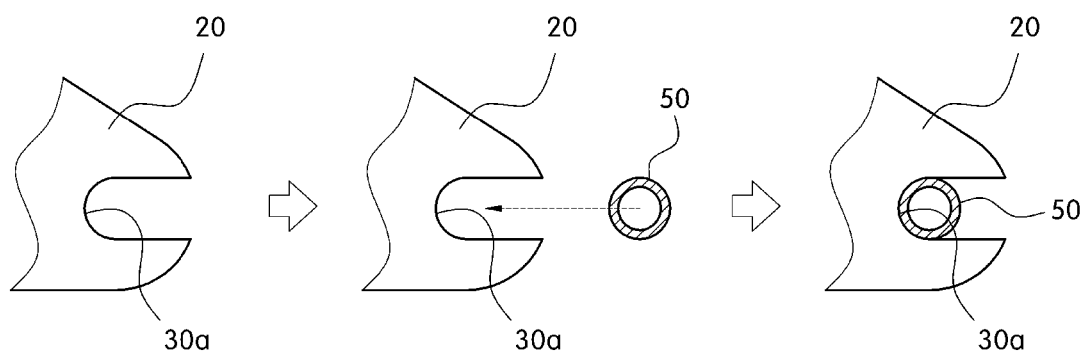
FIG. 8 is a schematic view illustrating the structure of a magnesium throttle body according to an exemplary embodiment of the present invention, in which a cooling water tube is mounted to the magnesium throttle body.

FIG. 7 is a schematic view illustrating a structure of the magnesium alloy throttle body according to the exemplary embodiment of the present invention, and FIG. 8 is a schematic view illustrating a structure according to the exemplary embodiment of the present invention in which a cooling water tube is mounted to the magnesium throttle body.

The magnesium throttle body 100 of the present invention is manufactured by using a die-casting mold 300 for manufacture of a throttle body. The magnesium throttle body 100 is molded integrally with a cooling water tube fixing portion 20 into which an integral cooling water tube 50 is press-inserted. A press-insertion opening 60 is formed so as to penetrate a front portion of the cooling water tube fixing portion 20 for press-insertion of the cooling water tube 40, and a fixing hole 30a is formed in a left-right direction to penetrate the cooling water tube fixing portion 20 so that the integral cooling water tube 50 can be placed and fixed.

The die-casting mold for a manufacture of the throttle body has a pin 303a with a predetermined diameter (e.g., 10 mm) as a means for forming the fixing hole 30a in the cooling water fixing portion 20. Here, the pin 303a has no ejection taper.

Figure 9:
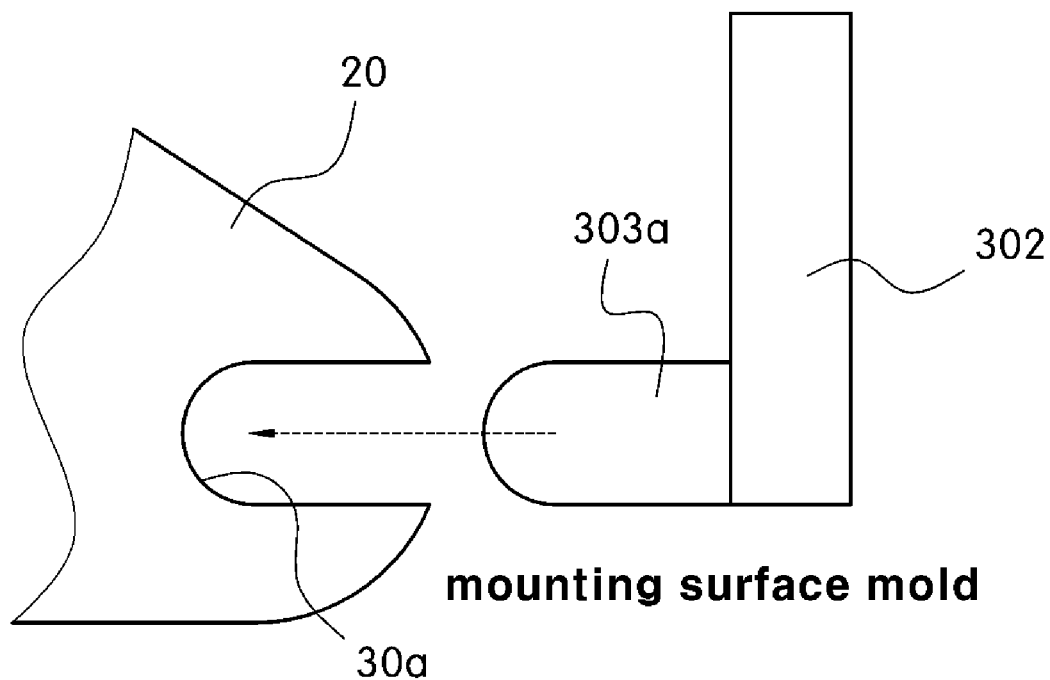
FIG. 9 shows a mounting surface mold having a pint to realize a cooling water tube mounting structure in a magnesium throttle body according to an exemplary embodiment of the present invention.

As shown in FIG. 9, unlike the prior art pin 303b mounted to the side mold 301 of the die-casting mold, the pin 303a for forming the fixing hole 30a and the press-insertion opening 60 in the cooling water tube fixing portion 20 is installed in the mounting surface mold 302.

In a state that the pin 303a of a diameter of 10 mm having no ejection taper is mounted to the mounting surface mold 302 of the die-casting mold, the magnesium throttle body 100 is molded in a designed form. At this time, the cooling tube fixing portion 20 is molded integrally with the throttle body 100, and the press-insertion opening 60 and the fixing hole 30a through which the integral cooling tube 50 is press-inserted into the cooling water tube fixing portion 20 are formed by the pin 303a installed in the mold 300.

When the integral cooling water tube 50 is press-inserted into the fixing hole 30a of the cooling water tube fixing portion 20, the magnesium throttle body 100 and the cooling water do not directly contact each other, thereby preventing a corrosion phenomenon which may occur in the throttle body made of a magnesium alloy and securing strong durability without having an oxidization reaction.

As described above, according to the present invention, since the throttle body is made of a magnesium-based material, i.e., a magnesium-based ally instead of an aluminum-based material, it is possible to reduce the weight of the throttle body.

Further, since the integral cooling water tube is press-inserted into the cooling water tube fixing portion molded integrally with the throttle body through the fixing hole and the press-insertion opening, the magnesium throttle body and the cooling water do not contact directly, thereby preventing a corrosion phenomenon from occurring in the throttle body made of a magnesium alloy.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A throttle body for a vehicle which is made of magnesium-based material and comprises a cooling water tube fixing portion, into which a cooling water tube is press-inserted, wherein a press-insertion opening is formed on a front portion of the cooling water tube fixing portion for press-insertion of the cooling water tube, and wherein a fixing hole is formed in a left-right direction to penetrate the cooling water tube fixing portion so that the cooling water tube can be placed and fixed, and wherein the cooling water tube fixing portion is formed integrally with the throttle body.

2. The throttle body of claim 1, wherein the throttle body is manufactured by a mold that includes a pin having a diameter of about 10 mm and having no ejection taper, the pin being used to form the fixing hole in the cooling water tube fixing portion.

* * * * *